United States Patent
Zheng et al.

(10) Patent No.: US 7,060,315 B2
(45) Date of Patent: *Jun. 13, 2006

(54) AROMA-CONTAINING COMPONENTS

(75) Inventors: Ying Zheng, Dublin, OH (US);
Anthony Klueppel, Dublin, OH (US);
Pu-Sheng Cheng, Dublin, OH (US);
Christian Milo, Epalinges (CH);
Rachid Rahmani, Marysville, OH (US)

(73) Assignee: Nestec S.A., Vevey (CH)

( * ) Notice: Subject to any disclaimer, the term of this patent is extended or adjusted under 35 U.S.C. 154(b) by 254 days.

This patent is subject to a terminal disclaimer.

(21) Appl. No.: 10/661,432

(22) Filed: Sep. 11, 2003

(65) Prior Publication Data

US 2004/0081737 A1  Apr. 29, 2004

Related U.S. Application Data

(63) Continuation of application No. PCT/EP02/03027, filed on Mar. 13, 2002

(60) Provisional application No. 60/278,506, filed on Mar. 23, 2001.

(51) Int. Cl.
*A23L 1/22*  (2006.01)

(52) U.S. Cl. ............. 426/534; 426/312; 426/535; 426/537; 426/590; 426/650

(58) Field of Classification Search ............ 426/312, 426/534, 535, 536, 537, 538, 590, 650, 654
See application file for complete search history.

(56) References Cited

U.S. PATENT DOCUMENTS

| | | | |
|---|---|---|---|
| 2,892,718 A | 6/1959 | Stone | 99/48 |
| 3,421,906 A | 1/1969 | Reich et al. | 99/152 |
| 3,482,987 A | 12/1969 | Pitchon et al. | 426/460 |
| 3,540,889 A | 11/1970 | Clinton et al. | 99/71 |
| 4,287,995 A | 9/1981 | Moriya | 215/228 |
| 4,378,380 A | 3/1983 | Scarpellino et al. | 426/533 |
| 4,539,216 A | 9/1985 | Tse | 426/597 |
| 4,897,273 A | 1/1990 | Kotaki et al. | 426/118 |
| 5,364,555 A | 11/1994 | Zenner et al. | 252/188.28 |
| 5,888,562 A | 3/1999 | Hansen et al. | |
| 5,922,380 A | 7/1999 | Takihara et al. | |
| 2001/0008647 A1 | 7/2001 | Belrhlid et al. | 426/535 |

FOREIGN PATENT DOCUMENTS

| | | |
|---|---|---|
| CN | 1109277 | 4/1995 |
| EP | 0 277 688 | 1/1988 |
| EP | 0328336 | 8/1989 |
| EP | 0861596 | 9/1998 |
| EP | 0 934 702 | 8/1999 |
| EP | 0 963 706 | 12/1999 |
| GB | 640241 | 7/1950 |
| HU | 44914 | 4/1986 |
| JP | 62278948 | 12/1987 |
| JP | 08182486 | 7/1996 |
| JP | 8196212 | 8/1996 |
| JP | 2000-116364 | 4/2000 |
| WO | WO9518540 | 7/1995 |
| WO | WO9611861 | 4/1996 |
| WO | WO 0069274 | 11/2000 |
| WO | WO 02/087360 | 11/2002 |

OTHER PUBLICATIONS

Holscher, W. et al, XP008007644, "Investigations of Roasted Coffee Freshness With An Improved Headspace Technique–Aromafrische Mittles Einer Vergesserten Headspace–Methodik", Forschung, vol. 195, No. 1, 1992, pp. 33–38.

Semmelroch, P. et al., XP000602989 "Analysis of Roasted Coffee Powders And Brews By Gas Chromatography–Olfactometry of Headspace Samples" Lebensmittel Wissenshaft Und Technologies, vol. 28, No. 3, 1995, pp. 310–313.

*Primary Examiner*—Leslie Wong
(74) *Attorney, Agent, or Firm*—Winston & Strawn LLP

(57) ABSTRACT

The aroma-improving agent is present with the aroma-containing component, such as chocolate, cocoa, tea or coffee, in an amount effective to chemically interact with aroma compounds to form an improved aroma-containing component which (a) enhance a significant portion of one or more of the desirable flavor or sensory characteristics of the aroma in the aroma-containing component, or (b) reduces one or more non-desirable flavor and sensory characteristics. The aroma-improving agent preferably is a nucleophile that contains sulfur or nitrogen, such as sulfur dioxide, sulfites, substances that contain or generate sulfite, thiols, amines or amino acids.

24 Claims, No Drawings

AROMA-CONTAINING COMPONENTS

CROSS REFERENCE

This application is a continuation of the U.S. National Stage designation of International Application PCT/EP02/03027 filed Mar. 13, 2002, the content of which is expressly incorporated herein by reference thereto, and claims priority to U.S. provisional application Ser. No. 60/278,506, filed Mar. 23, 2001.

TECHNICAL FIELD

The invention relates to a method for improving aromas obtainable from an aroma-containing component so that improvements of flavoring, taste, or other desirable sensory characteristics are provided. The invention also relates to the treated aroma-containing components that provide improved aromas. These improved aromas contain increased amounts of compounds that improve the desirable flavor or sensory characteristics of the aroma and reduced amounts of compounds that contribute to or generate undesirable characteristics of the aroma. Suitable aroma-containing components that can be improved include chocolate aroma, tea aroma and preferably coffee aroma.

BACKGROUND ART

Flavoring components are utilized in a wide variety of food and beverage products to impart, provide, modify, or improve the flavor or taste to the product. Such components often inherit some undesirable characteristics due to processing of the raw materials. Also, it is possible that desirable flavor characteristics can be lost or degraded after processing or storage over time. All these undesirable characteristics result in lower quality of products to which these components are added.

For example, coffee aroma derived from Robusta coffee beans is perceived as harsh, rubbery, or earthy, and is undesirable for some consumers. Coffee aroma from low grade Arabica coffee beans is also perceived to be fermented, baggy, or cereal in nature. Another example, delicate coffee aroma is often degraded, lost during processing as seen in instant coffee and ready-to-drink manufacturing methods. Also, coffee aroma is known to be very unstable. As coffee aroma degrades, it generates unpleasant and non-coffee-like notes that are undesirable. This degradation substantially reduces the perceived quality of the product. For this reason, special attention must be paid to the preparation and storage of flavoring components such as coffee aroma so that desirable aroma components are enhanced or undesirable components are reduced or eliminated.

The prior art recognizes that various flavor protective agents can be added to food or beverage products in order to preserve, maintain, or improve the flavor characteristics of such products. It is well known in the art that sulfites can be added to beverages such as beer or wine to preserve the flavor of such beverages. Generally, sulfites act as antioxidants to prevent deterioration of the flavor. For example, sulfites can react with oxygen to prevent deterioration of the flavor of the product due to oxidation of the flavoring component.

Also, Japanese patent application 08/196212 discloses the addition of sulfite, catalase, cysteine, or glutathione to a coffee beverage when liquid is added to reconstitute the beverage. This is not very effective as the sulfite simply dissolves in the beverage without significantly improving or preserving the aroma because the sulfite is added into the whole food matrix and is integrated therein.

Instead of adding the sulfites directly to food products, U.S. Pat. No. 4,536,409 discloses that sulfites may be incorporated into the packaging to prevent absorption of oxygen into the packaged food. Again, oxidation of the flavor component is reduced so that the desired flavor of the food is retained for a longer period of time.

U.S. Pat. No. 3,540,889 discloses that methyl mercaptan can be added to an aqueous extract of soluble coffee solids prior to drying the extract to a stable moisture content for improving the flavor of this extract when it is reconstituted as a coffee beverage.

Despite these disclosures, there still remains a need for improvement of aromas by enhancing desirable aroma components, reducing undesirable components, and preserving volatile flavoring components in order to improve their ability to impart the desired flavor, taste, and other sensory characteristics to foods to which they are added. The present invention now provides a number of practical solutions that satisfy this need.

SUMMARY OF THE INVENTION

The invention relates to a method for preparing an aroma-containing component which releases an aroma having increased amounts of desirable flavor or sensory. This method comprises treating the aroma-containing component with an aroma-improving agent that chemically interacts with compounds associated with the aroma-containing component to generate an improved aroma that contains (a) increased amounts of compounds that provide or improve the desirable flavor or sensory characteristics of the aroma, (b) reduced amounts of compounds that suppress desirable flavor characteristics or contribute to or generate undesirable characteristics, or both. These improvements are obtained by the interaction of the aroma-improving agent with compounds associated with the aroma-containing component, such as by reaction, complexation, or scavenging.

The aroma-improving agent is preferably a compound that contains at least one atom having at least one lone pair of electrons, i.e., a nucleophile, and is present in an amount sufficient to generate desirable compounds or react with undesirable reactive compounds associated with the aroma-providing component. Suitable improving agents are compounds that contain at least one atom of sulfur, nitrogen, oxygen or carbon, or those that contain or generate thiols. Most preferred are $SO_2$, a sulfite, a substance that contains or generates a sulfite, a thiol, an amine or an amino acid, or cysteine or glutathione or one of their salts.

In this method, the aroma-improving agent is added to a substance that is subsequently processed to obtain the improved aroma. A preferred substance is coffee beans. In one embodiment, coffee beans are treated prior to roasting by soaking the beans in a solution of the aroma-improving agent, by mixing a powder of the aroma-improving agent with the beans or by exposing the beans to a gaseous environment that contains the aroma-improving agent, and then obtaining the improved aroma by roasting of the treated coffee beans.

In another embodiment, the coffee beans are roasted to generate an aroma and the generated aroma is contacted with the aroma-improving agent to form the improved aroma. The aroma may contact a gaseous environment that contains the aroma-improving agent, a solution of the aroma-improving agent, or a solid form of the aroma-improving agent that is optionally supported by a carrier.

In yet another embodiment, the coffee beans are roasted, quenched with a solution of the aroma-improving agent, and then ground to generate the improved aroma. Alternatively, the aroma-improving agent can be added to the beans during the grinding step.

In this method, the coffee beans may be Robusta beans, and the aroma-improving agent reduces harsh, rubbery, earthy notes and enhance smoothness. When the coffee beans are low grade Arabica beans, the aroma-improving agent reduces the fermented, baggy, woody, groundsey, or cereal notes and enhance roastiness.

The method may also be used when the aroma-containing substance comprises roast and ground coffee particles, with the aroma-improving agent being added before dispensing of a coffee beverage made by combining water with the particles. If desired, the particles with can be extracted with water to form a solution, with volatiles being stripped from the solution with steam and then condensed to obtain an aroma concentrate. In this embodiment, the aroma-improving agent can be added to the extraction water, the stripping steam or the aroma concentrate to provide the improved aroma.

The invention also relates to an aroma-containing component which is treated to release an improved aroma compared to untreated aroma-containing components, wherein the aroma has increased amounts of desirable flavor and sensory characteristics, decreased undesirable flavor or sensory characteristics, or both. The aroma generally comprises one or more of the following characteristics compared to untreated components: increased amounts of thiols; or the same or decreased amounts of carbonyl, aldehyde or diketone moieties. Also, the improved aroma comprises greater perceptible levels of roasty, sulfury, nutty, freshness and overall good flavor notes, with a decrease in rubbery, baggy, harsh, woody, groundsey, processey, pruney, molasses, oxidized or fermented notes. Also, the sensory characteristics of the aroma are released to a lesser amount but for a longer time compared to an untreated component. For example, when a food or beverage that contains the aroma-containing component is prepared, 65 to 90% of the sensory characteristics are initially released with the remaining amount released over a period of about 3 to 25 minutes.

As noted above, a preferred aroma-containing component is a substance that provides coffee aroma. The invention allows improved quality coffee products from low quality Robusta or Arabica beans.

DETAILED DESCRIPTION OF THE INVENTION

As used herein, the term "aroma-containing component" means a substance, material, or compound that is added to other food- or beverage-forming components to form a final product for consumption. The aroma-containing component may be treated during chemical or physical processing either before, during or after formation or generation of an aroma. Also, this treatment is conducted prior to or during the incorporation or addition of the aroma to the final food or beverage product. The treated aroma-containing product is capable of generating or providing an improved or enhanced aroma to the resulting food or beverage product. This would of course include substances such as coffee beans that are processed in various ways to provide coffee aroma.

As used herein, "coffee aroma" is defined to be the volatile flavor and aroma compounds that are present in coffee products such as roast coffee or coffee extracts. Thus, the invention preferably provides a method to improve coffee aroma by contact of a substance that provides such aroma with one or more of the aroma-improving agents described herein. These aroma-improving agents can also be utilized to delay or control the release of the aroma after a food or beverage is prepared for consumption. All these effects whether alone or together result in the perception, by the consumer, of a more desirable beverage, e.g., one that maintains an preserved fresh, roasty over the entire time that the beverage is being consumed rather than just upon initial preparation of the beverage.

As used herein, the term "desirable flavor or sensory characteristics" refer to the flavor, aroma, or other organoleptic properties of a food or beverage product that is reminiscent of a freshly prepared product for consumption.

As used herein, the term "undesirable compounds" refer to the volatile compounds of a aroma-containing component that promote degradation of other volatile compounds that contribute to desirable flavor or sensory characteristics.

The association of an aroma-improving agent with an aroma-containing component enables the skilled artisan to recover or generate an improved aroma that has number of advantages. First of all, deleterious compounds that are normally present with the aroma react, complex, or are scavenged by the agent. Also, compounds that can detract from the desirable flavor or sensory characteristics of the aroma also react or form adducts or complexes with the aroma-improving agent. Finally, desirable compounds are often released by such reactions. In addition to removing or masking undesirable or off flavors, the increased amounts of desirable compounds improves the perceived freshness and desirability of the food or beverage from which the aroma emanates.

Generally, these detrimental components are carbonyl groups contained in compounds such as aldehydes or ketones. The aroma-improving agent reacts with these carbonyl groups to form adducts which do not react with the other aroma-containing components to decrease the overall flavor characteristics. The proportion of adducted carbonyls ranges from 10% to 100% of total carbonyls, and the pyrroles and methane thiol are retained at more than 30% of their initial concentrations during 6 months to one year storage of the aroma at ambient temperature.

The preferred aroma-improving agents also act as or include anti-oxidants or oxygen/free radical scavengers to prevent deterioration of the flavor characteristics of the coffee aroma due to oxidation from oxygen, free radicals or other oxidizing compounds. The preferred agents can also promote levels of thiols, such as by cleavage of disulfide bonds, that are then preserved by the endogenous antioxidant activity. All together, they ensure the quality of the resulting products to be not only more roasty/sulfury and less woody/green/groundsy/processey but also more stable over time.

While the most preferred aroma is coffee aroma, the improved aromas of this invention are intended to be a generic definition of all types of aromas, including those aromas in aqueous or water, oil, emulsion, forms, as well as those which are encapsulated, and the like. Specific mention can be made of chocolate or cocoa aroma, tea aroma, malt, Maillard reaction product or other aromas that are derived from or recovered after roasting or cooking of a raw material, substance or compound of an aroma-containing component.

The principles of the invention are now illustrated for the preferred embodiments where coffee aroma is disclosed as the most preferred aroma. Coffee aroma is used as a flavoring agent for various foods or beverages and particularly in soluble coffee, coffee concentrate and ready to drink coffee beverages to improve the flavor, taste, and other sensory characteristics of these beverages.

There are a number of known methods for obtaining coffee aroma, and any can be utilized in this invention. Typical methods include, but are not limited to, standard instant coffee processing in which stripping, gas flushing, or other methods are used to generate and recover the aroma, the collection of gases from the grinding, heating, cooking, or other processing steps, or the extraction of the aroma from any of the processing liquids. Extraction techniques include, but are not limited to, liquid/liquid extraction, $CO_2$ extraction, oil extraction, stripping, distillation, fractionation, flashing, or gas flushing of the processing liquid to obtain the aroma.

There are a number of different aroma-improving agents that can be used in this invention. These agents can be used alone or in combination. Also, a single agent can be applied to the aroma-containing component at different times or at different points in the processing of the component. These agents generally include any compounds that include one or more atoms that have at least one set of unpaired electrons. Typical atoms that have this property are sulfur, nitrogen, oxygen and carbon although others can be used if desired. The properties of those atoms are commonly defined and known. Preferred aroma-improving agents include sulfur dioxide ($SO_2$), sulfites, and compounds that generate or contain thiols, amines, or amino acids. Specifically preferred compounds include any FDA generally regarded as safe (GRAS) sulfiting agent, such as $SO_2$, sodium and potassium sulfites, sodium and potassium metabisulfites, or sodium or potassium bisulfites. Sulfur containing amino acids, such as cysteine and homocysteine, whether used alone or in peptides or proteins, is also advantageous, as is glutathione. Materials that contain or generate sulfites, such as yeasts or yeast extracts, or those that generate thiols, such as disulfides, can also be used.

Nucleophiles such as sulfite and cysteine react reversibly and selectively with carbonyls. In addition, sulfites and cysteine are a good antioxidants and free-radical scavengers. They also irreversibly react with disulfides to generate free thiols that are effective to improve the aroma. Such thiols can also impart desirable roasty coffee notes to the aroma or can be used to mask coffee negative notes such as woody, processey or groundsy notes. Due to these endogenous antioxidant activities, the degradation of thiols and pyrroles are reduced or inhibited. As pyrroles provide a desirable nutty note to the aroma, the retention of pyrroles in the aroma is beneficial.

Nucleophile addition to coffee results in more roasty/sulfury/nutty and less woody/green/harsh in the product so that even the initial product is perceived differently than the untreated control. After one-year ambient storage, the product was even better liked by consumers than the freshly made untreated control.

Generally, the agent is associated with the flavoring component so that the active compound is present in an amount of about 1 ppm to 50,000 ppm. A most preferred agent is sodium sulfite and it can be used at a level of about 500 ppm to 1,000 ppm. The ratio of aroma-improving agent to flavor compounds (based on pure organic compounds) may be in the range of about 0.1:1 to 32:1 and is preferably about 2:1 to 20:1.

The aroma concentration and its constituents are determined by a conventional analytical method. Generally, a headspace volatile profile was completed using a CDS 6000 purge and trap device, an Archon purge and trap autosampler device, and a HP 6890 GC/HP 5973 MS. The purge and trap procedure involves bubbling an inert gas (helium) through a distillate sample at ambient temperature allowing the volatile components to be efficiently transferred from the aqueous phase to the vapor phase. The vapor is swept through a Tenax column (CDS analytical part no. 30E35063), where the volatile components are trapped. The trapped components are rapidly heated and back-flushed with helium to desorb the volatile analytes onto a cryogenic focusing module. The cryogenic focusing module is rapidly heated to desorb the volatile analytes onto a gas chromatographic. The gas chromatographic column is heated to elute the components, which are detected with a HP 5973 mass spectrometer. The aroma compounds are measured as ppm equivalents of methylbutyrate.

The addition of the aroma-improving agent has also been found to extend the shelf life of coffee aroma so as to allow the aroma, after storage for extended periods of time, to retain a flavor which is reminiscent of freshly brewed coffee in various coffee beverages that are reconstituted after storage of the aroma. Without being bound by theory, it is believed that several mechanisms are occurring to achieve the stability and increased storage life of the fresh flavor, with one or a combination of these mechanisms occurring simultaneously to achieve the improvements:

the aroma-improving agent reacts with carbonyl groups contained in compounds such as aldehydes or ketones to form adducts which do not react with the other coffee aroma compounds to decrease the overall flavor characteristics;

the aroma-improving agent cleavages disulfide bonds to promote levels of desirable free thiols; or the aroma-improving agent acts as an oxygen scavenger to prevent deterioration of the flavor characteristics of the coffee aroma due to oxidation; or the aroma-improving agent acts as an anti-oxidant to prevent free radicals and other oxidizing compounds from deteriorating the flavor characteristics of the aroma due to oxidation; or these endogenous antioxidant activities preserve thiol and pyrrole degradation over time; or the agent reduces or controls undesirable browning, polymerization, or condensation reactions; or the agent binds carbonyls during storage at least some or all of which are released upon reconstitution into beverage.

In addition, the presence of aldehydes, such as acetaldehyde, causes the flavors to degrade. The aroma-improving agent reacts with the aldehyde to form aldehyde derivatives that do not negatively impact the desirable notes of the improved aroma. For this reason, C-nucleophiles, such as 1,3-dicarbonyl compounds and various thiazolium salts are particularly useful agents. For example, thiamin (Vitamin B1) is known to react with aldehydes to form aldehyde derivatives that do not deleteriously affect coffee aroma.

In conventional non-treated or non-stabilized coffee aroma, the amounts of methanethiol and pyrrole are overshadowed by the aldehyde and ketone compounds. Even if the agent is added to the final product that contains an untreated or non-stabilized aroma-containing component, these volatiles are substantially degraded because the agent is added to the whole food matrix and is integrated therewith so that less of it is available to interact with the aroma-containing component. In contrast, the improved aromas of the invention are characterized by significantly reduced aldehyde and ketone levels compared to the conventional components. The methane thiol and pyrrole levels remain at equal or even greater levels to thus impart the desirable organoleptic properties to the aroma.

In particular, the improved aroma obtained from the treatment of aroma-containing component by the aroma-improving agent are characterized as having the following contents of volatile compounds:

Pyrroles: essentially all retained after 1 month: at least about 60 to 90% retained after 3 months and at least 30 to 50% of original retained even after 1 year storage; or Thiols: at least as much as or more that original amount after 1 month; greater that 60 to 90% after 3 months with more than 40 to 50% of original retained after 1 year storage, or Aldehydes and Ketones: removed or bound by at least about 30% and up to as much as 50 to 90% from the original amount at all relevant measurement time periods.

The present method can be used to improve the quality of coffee products. It is generally known that Arabica beans provide higher quality, so that coffee products that contain greater amounts of Arabica beans are considered to have higher quality and are more desirable. Even so, many conventional coffee products utilize a significant portion of the less expensive, lower quality Robusta beans. The treatment method of the present invention now enables the higher quality of Arabica beans to be enhanced when used alone as well as when retained in products that contain higher levels of Robusta beans. The aroma-improving agent of the invention also enables a greater amount or proportion of Robusta beans to be used or substituted for Arabica beans in a coffee product without loss of quality of the product. Alternatively, products which maintain the current proportion of Arabica and Robusta beans will be perceived as being of even higher quality. Thus, better quality coffee can be provided without an increase in raw material (i.e., coffee bean) costs.

A study of coffee aroma with the use of sodium sulfite as an aroma-improving agent has shown that a significant amount of carbonyls (aldehydes and ketones) were bound with the sulfite to become non-volatile and thus absent from the headspace of a container that contained coffee aroma distillate. Also, a significant increase of methanethiol was detected after sulfite addition.

To illustrate the effect of an aroma-improving agent on coffee aroma, 1 g of sodium sulfite was added to 1000 g of coffee aroma distillate, the ingredients were mixed and then placed into a sealed bottle. The amounts of various compounds in the headspace of the bottle was determined before addition of the sulfite and again after two days. The results show that upon the treatment the initial amount of aldehyde and diketone compounds decreased by about 40% each while the amount of thiol compounds increased and the amount of pyrrole compounds remained the same over that period. As the thiols provide a desirable roasty note to the aroma, the presence of a greater amount of these compounds imparted a more roasty note to the aroma. Similarly, the maintenance of the pyrroles provided a nutty note to the aroma. Finally, undesirable flavors were reduced due to the lower amounts of aldehydes and ketones.

Without being bound by theory, it is believed that the aroma-improving agent serves a number of functions. In addition to its reaction with carbonyls, the agent apparently passivates the matrix of the aroma-containing component, and blocks binding sites for thiols. As thiols are not removed from the aroma, greater amounts are present to contribute to the desirable sensory characteristics of the aroma.

Instead of sulfites, other compounds that contain or release thiols, amines or amino acids can be utilized. As noted herein, cysteine, homocysteine and glutathione are useful aroma-improving agents. These can be also used or added in the form of peptides or proteins that contain them.

The aroma-containing component can be treated with the aroma-improving agent by incorporating the agent into a material that is added to the aroma-containing component or to the aroma during processing, preparation or storage. This would enable the aroma-containing component or improved aroma to be separated from the material when a product for consumption is prepared.

The aroma-improving agent may be associated with the aroma-containing component by any one of a variety of methods. The following methods are described in connection with the generation of coffee aroma from coffee beans. The coffee beans can be treated with the aroma-improving agent at just about any point in its processing.

After harvesting of the coffee beans, the aroma-improving agent can be applied to the green coffee beans by soaking the beans in a solution of the agent, or by spraying the beans with a solution of the agent. These two methods are relatively simple and effective for distributing the agent relatively uniformly throughout the beans. It is also possible to add the agent as a solid, such as a powder, to the beans by mixing the two together. This is a more energy intensive method so that it is not preferred to a simple soaking. One of ordinary skill in the art can determine optimum amounts and concentrations of the agent to use by routine testing. The beans are then roasted to obtain the improved aroma.

It is alternatively possible to add the agent to the beans during the roasting method. This can be done by adding the agent as a powder or solution into the roasting ovens. Also, the roasting can be conducted in a gaseous atmosphere of the aroma-improving agent. In these methods, it is generally necessary to utilize a greater amount of aroma-improving agent because a portion of the agent is burned off during the roasting step.

Instead of adding the agent to the beans during the roasting method, it is possible to direct the aroma gas that is generated to contact the agent. This can be done by passing the aroma gas through a filter or other carrier in which the agent is incorporated. It is also possible to bubble the aroma gas through a solution of the agent, or to pass the aroma through a fixed or fluidized bed of the agent. As a skilled chemical engineer would realize, the equipment in which this contact occurs is designed to provide a sufficient amount of the agent or a sufficient contact time to produce the improved aroma. Finally, the agent in any form can be simply added to the final aroma that is collected.

Another point where the agent can be contacted with the beans is as a quench solution after roasting is completed. This is a particularly effective way to accomplish cooling of the roasted beans as well as utilizing the heat of the roasted beans to accelerate the reaction of the agent with the undesirable compounds in the roasted beans. This also requires no new equipment as the quench solution is simply modified to carry the agent to the roasted beans. The quench solution can be sprayed onto the beans or the beans can be dropped into the solution of the agent.

It is also possible to add the agent to the beans after the quenching operation. The beans are cool at this point in the method, so that the agent in powder, liquid or gaseous form can contact the quenched beans to associate the agent with the beans. As noted above, it is preferred to add the agent while the beans are hot so that the heat can accelerate the reactions between the undesirable substances in the beans and the agent.

Next, the roasted and cooled bans are subjected to a grinding step, and this step generates coffee aroma. Here, the agent can be added to the beans just prior to or during the grinding step if not already added with the quench or after it. Again, the agent can be added in solid or liquid form, or the grinding can be carried out in an atmosphere of the agent in gaseous form. Alternatively, it is possible to direct the aroma gas that is generated during the grinding step to contact the agent. This can be done by passing the aroma through a filter or other carrier in which the agent is incorporated. It is also possible to bubble the aroma gas through a solution of the agent, or by passing the grinding aroma through a fixed or fluidized bed of the agent.

The resulting roast and ground coffee particles form yet another substance that contains coffee aroma. These particles can be contacted with the aroma-improving agent at a number of different points before the final beverage is prepared. The agent can be added to the particles during preparation of the beverage, for example, as a powder or incorporated in a porous filter, film or membrane through which the water or beverage must pass before dispensing. The agent can also be added to the water that is used to contact the particles to prepare the beverage.

The roast and ground coffee is typically processed further for certain products. For example, the particles are typically extracted with water to form a solution, volatiles from are stripped from the solution with steam, and the stripped volatiles are concentrated to obtain a coffee concentrate. In these processes, the aroma-improving agent can be added to the extraction water, the stripping steam or the concentrate to provide the improved aroma. The agent can be added at more than one of these steps for optimum results.

The aroma-improving agent is typically used at the amounts stated herein to form a mixture with the aroma-containing component. When sulfites are used, an appropriate dosage range would be that which provides about 1 ppm to 50,000 ppm of sulfite per unit weight of aroma or aroma distillate. Preferably, the ratio of sodium sulfite to aroma volatile compounds is preferably from about 2:1 to 20:1. Depending upon the specific aroma-improving agent used, these amounts can vary but the optimum amounts can be readily determined by one of ordinary skill in the art through routine testing.

As noted above, the aroma-improving agent can be associated with or added to the aroma-containing component as a powder, liquid, or as a gas.

When the aroma-improving agent and aroma-containing component are in different forms, they can be associated with each other in a way that efficiently and effectively utilizes the different forms. For example, if one is a solid or liquid and the other is a gas, a treatment chamber can be provided where the gas is bubbled through the liquid or around the solid to achieve the adducting of carbonyl groups or the scavenging of oxygen or other free radicals. The improved or enhanced aroma-containing component can then be recovered and, in the most preferred arrangement, separately stored from the food or beverage or food or beverage forming component to which it is to be added when that component is to be prepared for consumption. When the specific gravities or other properties are sufficiently distinct, countercurrent flow processing can be used.

Another desirable application of different forms of the components can be utilized when the aroma-containing component is a liquid or gas and the aroma-improving agent is a solid. The aroma-improving agent can be incorporated onto a porous support, such as a membrane or filter, and the aroma-containing component can be directed to pass adjacent to, around, or even t through the membrane or filter. This enables the aroma-improving agent to react with, scavenge or bind to the undesirable compounds in the aroma-containing agent. Typical materials for such membranes and filters include paper or permeable plastics or films into or upon which the aroma-improving agent is incorporated, coated or otherwise associated. It is also possible to configure solid aroma-improving agents in the form of porous materials through or around which the gaseous or liquid aroma-containing component will pass to achieve the desired adducting or scavenging results.

Alternatively and preferably, the aroma-improving agent can be placed into or upon the walls of a package or container which is to be used to separately store the aroma-containing component, thus achieving the desired adducting or scavenging during storage by simply placing the aroma-containing component into the package or container wherein it can contact the agent. The aroma-improving agent can be simply placed in the compartment as a powder or liquid, it can be provided in the form of a small permeable pouch, such as a "tea bag" or other permeable enclosure, or it can be incorporated in a separate compartment which has a permeable cover to enable the aroma-containing component to contact the agent therein. One of ordinary skill in the art can determine the most effective way to arrange the package or container so that the aroma-containing component and aroma-improving agent can come into contact with each other depending upon the specific aroma-providing component, agent, and the desired aroma properties. If desired, the agent can be added both to the aroma-containing component and to the packaging to which it is added.

In a specific arrangement, the agent is added to a package that contains the aroma-containing component or to the aroma in a form that is not soluble, and a screen, membrane or filter is used to retain the agent in the package when the aroma-containing component or aroma is removed.

In another arrangement, the agent can be incorporated into or coated upon one or more interior surfaces of the container or package for contact with the aroma-providing component or the aroma during storage therein. This is advantageous because the aroma-containing component or aroma can be removed from the package or container without having to separate or isolate the agent from it prior to use in preparing the food or beverage product for consumption.

Yet another arrangement is the positioning or immobilization of one component and the passage of the other therearound, thereover or therethrough. In one version of this embodiment, the agent is provided as a sheet, film, block, insert, powder, mass or other structure for contact with the aroma-containing component as they move past, around and through each other. For example, the agent can be added to the aroma-containing component for a time sufficient to achieve the desired adducting or scavenging and then can be separated from the aroma-containing component or improved aroma.

It has been found that the improved aroma-containing component or the aroma-improving agent and aroma-containing component combination can be stored at room temperature for extended periods of time without loss of the desirable aroma at the time when the product is made for consumption. The maintenance of the desirable notes for a period of at least six months and even longer is easily achieved for coffee aroma with similar benefits obtainable for other aromas. The aroma-containing component provides new, improved aromas that are different from the conventionally expected aroma but which are generally perceived as being superior to the conventional aroma. Improved coffee aroma, for example, provides more intense, more roasty notes than conventional coffee. Again, this superior aroma is maintained for a period of at least six months to one year when the aroma or the aroma-containing component is stored at room temperature.

For maintaining these improved or superior aroma characteristics for even longer times, storage at temperatures below ambient can be used. Temperatures as low as 10° C., or even 0° C. or lower can be used for this purpose. Generally, storage stability for more than one year at room temperature is sufficient for many aroma-containing components so that lower temperature storage is not necessary. The person of ordinary skill in the art can determine by routine testing the optimum storage temperature for retaining the effective aroma characteristics for the desired time periods depending upon the specific aroma-containing component, agent, and desired aroma properties after storage.

Consider an aroma-containing component that is not treated but which is stored separately from the food or beverage. This component can retain the desired aroma characteristics for a period of at least 8 to 10 weeks compared to around three weeks for aroma-containing components that are stored with the food or beverage product. In comparison, treated aroma-containing products retain desirable aroma characteristics for a period of at least six months to one year or even longer.

It has also been found that the improved aroma-containing components of the invention provide a controlled and prolonged release of aroma after the beverage or food product is prepared for consumption. When a beverage or food product is prepared for consumption, the aroma from a treated aroma-providing component is not released in the same way as that from an untreated aroma-providing component. Depending on the nature of the aroma compound, only approximately 65% to 90% is released compared to that of the untreated component.

This reduced level of release is observed mainly for carbonyl compounds whereas thiols are released to more than 100% typically between 110 to 140%. The release is also maintained for a longer period of time, e.g., at least 3 to 20 and preferably 6 to 15 minutes at 60° C. after the food or beverage is prepared for consumption, compared to a maintenance of release of only about 1 to 5 minutes for an untreated aroma-containing product. This contributes to the final perception that the food or beverage product has improved sensory characteristics and an improved quality to stand for a sustained time, thus providing the consumer with a more appealing food or beverage product for a significantly longer time during consumption.

Depending upon the specific type of food or beverage product, as well as the specific type of aroma-improving agent and treatment time, the release of the desirable sensory characteristics of the aroma can be sustained over a period of from about 3 to 25 minutes. Obviously, larger quantities of the food or beverage product, such as a soup or entire meal, would prefer to have the longer release time for the aroma, whereas for small quantities, such as espresso coffee, it would be appropriate to utilize the shorter aroma retention time because of the shorter time it would take to consume such products.

The time of treatment of the aroma-containing component and the aroma-improving agent is also a consideration. Also, the relative amounts of aroma-improving agent and aroma-containing component play a factor in this. Of course, the more aroma-improving agent and the longer treatment times that are used, the more carbonyl groups form adducts and the more oxygen or free radicals are scavenged. Depending upon the intended results, it may not be necessary to remove all of the oxygen and free radicals, nor to adduct all of the carbonyls. Again, one of ordinary skill in the art can best select the relative amounts of the components, the treatment times and the storage temperatures so that the treated aroma-containing component can provide the optimum flavor characteristics to the intended product at the eventual time of use.

As noted above, the addition of an aroma-improving agent to coffee particles during preparation of a coffee product results in more roasty/sulfury/nutty notes and less woody/green/harsh notes in the product so that even the initial product is perceived differently than an untreated control.

The form of the improved aroma-containing product represents another feature of the invention. While any form can be used, components in a gaseous form present additional handling considerations. While this may present less of a problem in a commercial setting, such as a cafe or restaurant where coffee is purchased for relatively immediate consumption, it may not be as desirable for home use as the dispensation of a gas into a liquid is not trivial. For this reason, it is preferable for the aroma-containing component to be in liquid or solid form. When the final product is a liquid that is prepared by the addition of water, milk or other fluids, it is most desirable for the treated aroma-containing component to be in the form of a solid or liquid that is readily soluble in or readily mixable with the fluid that is used to prepare the product.

The provision of the improved aroma-containing component as a powder can be achieved in a number of ways. When the treated aroma-containing component is a liquid, it can readily be converted into a solid by conventional drying techniques such as spray drying or freeze drying using any carriers. In this regard, it is highly desirable to conduct the spray drying or freeze drying operation on a solution of the improved aroma-containing component as soon as possible after treatment by the aroma-improving agent so that as much of the aroma in the aroma-containing component can be retained. If desired, the particle size of the spray-dried or freeze-dried powder can be varied by grinding or pulverization, with the size that is most desirable being one that readily dissolves (i.e., within one minute and preferably within 15–30 seconds) after being added to the fluid used to form the consumable product.

A number of different specific beverage-forming components can be improved by being combined with the treated aroma-containing components of the present invention. One product is a coffee concentrate in liquid form. For example, the treated aroma-containing component can be added to the concentrate prior to storage or can be stored separately until the time of preparation of the beverage. Depending upon the concentration of coffee in the concentrate, it may be sufficient to treat the concentrate after addition of the aroma-containing component. This method is not as preferred as separate treatment of the aroma-containing component.

Another product is ready-to-drink beverages. Here, the aroma-containing component is typically treated prior to addition to the beverage.

In products that include the treated aroma-containing component with a food or beverage, it is advantageous to store these products at lower temperatures, i.e., 0–10° C., since this retards the release of the desirable volatiles.

Instead of combining separately dried powders, it is within the scope of this invention to first reconstitute the food or beverage product with the improved aroma-containing component and thereafter quickly method the resulting product into a solid. Freeze-drying or spray-drying can be used for this purpose, and the drying step is conducted as soon as practical after reconstitution of the product. One way to do this would be to add the product-forming component and improved aroma-containing components into a liquid in a venturi or other device that provides acceleration or mixing of the components with the fluid. Thereafter, the liquid product is spray-dried or freeze-dried to a dry powder. Again, the particle size can be controlled to the desired range or subsequent milling, grinding, pulverizing or other particle size reduction techniques can be applied. The final product can be stored at room temperature for at least six months or even longer at lower temperatures until the time when the product is to be reconstituted. At that time, the aroma is released with essentially the same properties as if the product was freshly prepared, thus providing an appealing product for consumption.

Although not wishing to be bound by theory, it is believed that the drying step is effective because it is conducted rapidly after the mixing of the improved aroma-providing component with the food or beverage forming component in and the appropriate liquid at a low temperature, preferably 0–10° C. When the improved aroma-containing component is mixed with the food or beverage forming component and the reconstitution liquid, the aroma-improving agent is released as the aroma is released. As noted above, this method takes between 3 and 25 minutes to complete. If the drying method is conducted within two minutes, preferably within one minute and more preferably within 5 to 30 seconds after reconstitution of the product, the aroma becomes trapped in the product for release at a later time when the product is reconstituted. This method is preferred since it avoids the use of separate drying steps for the improved aroma-containing component and the food or beverage component.

When prepared in this fashion, it is not necessary to retain the treated aroma-containing component powder separately from the solid food or beverage forming components, as the aroma characteristics are retained until a liquid or fluid such as water or milk is added to form the food or beverage. Again, the storage of the powder or powder mixture can be made at room temperature or lower, if desired, depending upon the intended time of consumption. This type of arrangement is useful for products such as cold or hot powder drinks (i.e., NESQUIK, cocoas, flavored milk powders, or fruit drink mixes); puddings; soup mixes; sauce or gravy mixes; and, of course, all types of instant or ready-to-drink coffee products.

As noted herein, a significant extension of the time that desirable aroma characteristics are provided can be obtained by treating the aroma-containing component with the aroma-improving component separately before combining the treated aroma-containing component with the food or beverage forming component. Of course, separate storage of these components provides even longer retention of the desirable aroma characteristics during storage, particularly when the treated and improved aroma-containing component is stored at low (i.e., below freezing) temperatures. The resulting food or beverage product, after reconstitution, is perceived to have a fresher, more desirable aroma both after the product is reconstituted as well as over the entire consumption period of, e.g., 5 to 15 minutes.

Many of the aroma-improving agents disclosed herein also are effective free-radical scavengers, so that a sufficient amount of the aroma-improving agent is added to also scavenge free radicals. It is also possible to assist the aroma-improving agent by including a known antioxidant for this purpose. Preferred antioxidants include vitamin C and other ascorbates, tocopherols, and the like, and these are provided in an amount effective to reduce or prevent oxidation of compounds that provide the desirable flavor or sensory characteristics of the aroma.

In another embodiment, the aroma-improving agent can be combined with another additive prior to being associated with the aroma-containing component. A wide range of different additives can be used for this purpose. Many of these additives can serve a second function as a carrier for the aroma-improving agent. The additive can be in a solid or liquid form, and can be a solvent such as water, an oil such as MCT oil or other triglycerides, an emulsion, either water-in-oil or oil-in-water, a flavoring agent, a carbohydrate, a protein, or an antioxidant. Preferred antioxidants for use with coffee and tea aroma are catechins and polyphenols. Additional flavoring agents are typically utilized in very small amounts and are considered as micro-component additives, whereas carbohydrates, such as sugar and maltodextrin, are added in significantly greater amounts. The antioxidants mentioned above are also suitable candidates for use as carriers for the aroma-improving agent or the improved aroma-containing component. The component may also be incorporated in a matrix of oil, water, or other solvents, provided as an emulsion, encapsulated in other edible materials by techniques that are generally known in the art, may be frozen as a frost or dried to powder form prior to storage.

EXAMPLES

The following examples are presented to illustrate the most preferred embodiments of the invention.

Example 1

A roast and ground ("R&G") 100% Colombia coffee is extracted with water to form coffee extract. The extract is passed through a steam stripping column where the volatile flavor/aroma components are stripped out, condensed and collected as aroma distillate, with about 80 g aroma distillate collected per 100 g of R&G coffee.

The stripped extract is then concentrated to a solids level of about 55% to provide a coffee base concentrate. A small amount of sodium hydroxide is added to this coffee base concentrate at 0.1% by weight of coffee solids to minimize the acidity development during storage. This final coffee base concentrate is stored separately from the aroma distillate until being used to formulate a beverage.

An aroma-improving agent of sodium sulfite ($Na_2SO_3$) is used; 1 g of sodium sulfite in powder form is added to 1000 g of the distillate. This provides a dosage of 508 ppm (or 0.508 g) of $SO_2$ equivalent of sodium sulfite.

The sodium sulfite powder is mixed with the distillate with sufficient agitation to dissolve the sulfite into the distillate liquid. The resulting solution is stored in a sealed container that prevents the aroma from permeating out and that prevents oxygen from entering. When taste tested, the improved component is perceived to be more roasty, dairy, nutty, sulfury and less woody, groundsey, and processey compared to the same aroma component without sulfite.

Both the aroma distillate and the coffee base concentrate are then stored separately at room temperature for a period of 6 months. In order to prepare a beverage for consumption, the coffee base concentrate is then mixed with the aroma distillate and hot water is added to the mixture. Upon consumption, the resulting beverage is found to have a flavor that is reminiscent of fresh coffee. In addition, such flavor is even less woody/groundsy/processey than fresh coffee and free of storage off notes despite the relatively long storage time.

Example 2

An aroma distillate stream is obtained according to Example 1. Gaseous sulfur dioxide is bubbled through the distillate. This provides an equivalent of 500 ppm $SO_2$ in the aroma distillate. As compared to the aroma component without sulfite, the improved component is perceived to be more roasty, dairy, nutty, sultrily and less woody, groundsey, and processey.

Example 3

The improved coffee aroma of Examples 1 and 2 can be encapsulated to form capsules that are stable and easy to handle so that they can be added to the coffee solids at any time during the beverage preparation method. The encapsulated aroma can be added to solids that are already in soluble powder form or can be added as flavoring to a ready to drink beverage or other food product, for example an ice cream composition.

Example 4

Various food products, including powdered coffee mixes, ready to drink beverages, ice cream, and candy, can be formulated with appropriate amounts of the improved coffee aroma of Examples 1 to 3.

Example 5

R&G coffee is extracted with water to form coffee extract. The extract is passed through a steam stripping column where the volatile flavor/aroma components are stripped out, condensed and collected as aroma distillate at 80 grams per 100 grams of R&G coffee.

The stripped extract is then concentrated to a solids level of about 55% to provide a coffee base concentrate. A small amount of sodium hydroxide is added to this coffee base concentrate at 0.1% by weight of coffee solids to minimize the acidity development during storage. This final coffee base concentrate is stored separately from the aroma distillate until being used to formulate a beverage.

An aroma-improving agent of cysteine is used; 1 g in powder form are added to 1000 g of the distillate. The cysteine powder is mixed with the distillate with sufficient agitation to dissolve the cysteine into the distillate liquid. As compared to the aroma component without cysteine, the improved component is perceived to be more roasty, dairy, nutty, sulfury and less woody, groundsey, and processey. To maintain these characteristics, the resulting solution is stored in a sealed container that prevents the aroma from permeating out and oxygen from entering.

Both the aroma distillate and the coffee base concentrate are stored separately in separate containers at room temperature for a period of 6 months. In order to prepare a beverage for consumption, the coffee base concentrate is then mixed with the aroma distillate and hot water is added to the mixture. Upon consumption, the resulting beverage is found to have a flavor that is reminiscent of fresh coffee, despite the relatively long storage time.

Example 6

A R&G 100% Robusta coffee is extracted with water to form coffee extract. The extract is passed through a steam stripping column where the volatile flavor/aroma components are stripped out, condensed and collected as aroma distillate, with about 15 g aroma distillate collected per 100 g of R&G coffee.

The stripped extract is then concentrated to a solids level of about 55% to provide a coffee base concentrate.

An aroma-improving agent of sodium sulfite ($Na_2SO_3$) is used; 5 g of sodium sulfite in powder form is added to 1000 g of the distillate.

The sodium sulfite powder is mixed with the distillate with sufficient agitation to dissolve the sulfite into the distillate liquid. As compared to the aroma component without sulfite, the improved component is perceived to be more roasty, dairy, nutty, sulfury and less earthy, rubbery, and harsh.

The aroma component is mixed with coffee base concentrate and dried into instant coffee. The resulting beverage is less harsh, rubbery, and earthy and more smooth and balanced.

Example 7

The aroma of Example 6 is further stripped by steam to remove sulfite or sulfite-carbonyl adducts. The aroma is then encapsulated with carriers as the aroma-providing components for any coffee products. The resulting beverage is less harsh, rubbery, and earthy and more smooth and balanced.

Example 8

The aroma of Example 6 is steam stripped as Example 7. It then is mixed with coffee base concentrate and dried into instant coffee. The resulting beverage is less harsh, rubbery, and earthy and more smooth and balanced.

Example 9

Coffee aroma is collected by a cryogenic aroma recovery system into frost from R&G coffee by purging nitrogen gas through the coffee grinder system. The frost is further transferred into a sulfite-containing solution.

The resulting aroma component is more roasty, sulfury, nutty and less woody, groundsey, earthy, or rubbery.

The aroma component can be further processed to remove sulfite (such as oil/solvent extraction or stripping) and concentrated into aqueous, oil, or capsule for use as an aroma improver or enhancer for soluble, concentrated, or other ready to drink coffee products.

Example 10

50 grams of R&G coffee and 1500 grams of water are placed in a traditional coffee brewer. 0.4 gram of cysteine is mixed with the R&G or the water to make the brew. The resulting brew has enhanced coffee flavor.

While the preceding Examples were specifically directed to the treatment of coffee aroma, it will be immediately realized by one of ordinary skill in the art that aroma distillates from other sources as well as other aroma-containing components that contain aldehydes, pyrroles and other carbonyl-containing compounds may be treated in essentially the same manner in order to be improved or enhanced as disclosed herein. Also, the improved aroma-containing components can be added to any one of a wide variety of food or beverage products whether such products are consumed at room temperature, are cooled or frozen or after heating. Typical products include coffee powders, ready to drink beverage mixes, candy, cake frosting, or ice cream along with many others that are limited only by the imagination and creativity of the product formulator.

The term "about," as used herein, should generally be understood to refer to both numbers in a range of numerals. Moreover, all numerical ranges herein should be understood to include each whole integer within the range.

It is to be understood that the invention is not to be limited to the exact configuration as illustrated and described herein. Accordingly, all expedient modifications readily attainable by one of ordinary skill in the art from the disclosure set forth herein, or by routine experimentation therefrom, are deemed to be within the spirit and scope of the invention as defined by the appended claims.

What is claimed is:

1. A method for preparing an aroma-containing component which releases an aroma having increased amounts of desirable flavor or sensory characteristics during preparation of a food or beverage product, which method comprises treating an aroma-containing component that is isolated, concentrated or separated from a food, beverage, food-forming or beverage-forming material, with an aroma-improving agent of a nucleophile that contains at least one atom of sulfur or nitrogen providing at least one lone pair of electrons that chemically interacts with compounds associated with the aroma-containing component to generate an improved aroma that contains (a) increased amounts of compounds that provide or improve the desirable flavor or sensory characteristics of the aroma or (b) reduced amounts of compounds that suppress desirable flavor characteristics or contribute to or generate undesirable characteristics, and separately storing the treated aroma-containing component prior to contact with a further component of a food, beverage, food-forming or beverage-forming material and optionally with a liquid to form the food or beverage product for consumption so that, when combining the aroma-containing component with the material to form the product for consumption, the aroma-containing component imparts to the product an improved or enhanced aroma compared to the aroma provided by an untreated aroma-containing component.

2. The method of claim 1, wherein the aroma-improving agent contains or generates thiols and reacts with compounds associated with the aroma-containing agent to generate desirable compounds or remove undesirable reactive compounds.

3. The method of claim 1, wherein the improving agent is $SO_2$, a sulfite or a substance that contains or generates a sulfite, a thiol, an amine or an amino acid.

4. The method of claim 1, wherein the aroma-improving agent comprises cysteine or glutathione or one of their salts.

5. The method of claim 1, wherein the aroma-improving agent is added to a aroma-containing component that is subsequently processed to obtain the improved aroma.

6. The method of claim 1 wherein the aroma-containing component is coffee beans which are treated prior to roasting by soaking the beans in a solution of the aroma-improving agent, by mixing a powder of the aroma-improving agent with the beans or by exposing the beans to a gaseous environment that contains the aroma-improving agent, and then obtaining the improved aroma by roasting of the treated coffee beans.

7. The method of claim 1 wherein the aroma-containing component is coffee beans which are roasted to generate an aroma and the method comprises contacting the aroma with the aroma-improving agent to form the improved aroma, wherein the aroma contacts a gaseous environment that contains the aroma-improving agent, a solution of the aroma-improving agent, or a solid form of the aroma-improving agent that is optionally supported by a carrier.

8. The method of claim 1 wherein the aroma-containing component is coffee beans which are roasted and the method comprises quenching the roast beans with a solution of the aroma-improving agent, and then grinding the quenched beans to generate the improved aroma.

9. The method of claim 1 which further comprises roasting the coffee beans and grinding the roasted beans to obtain the improved aroma, wherein the aroma-improving agent is added to the beans during the grinding step.

10. The method of claim 1 wherein the aroma-containing component is Robusta coffee beans and the aroma-improving agent reduces harsh, rubbery, earthy notes and enhance smoothness.

11. The method of claim 1 wherein the aroma-containing component is low grade Arabica coffee beans and the aroma-improving agent reduces the fermented, baggy, woody, groundsey, or cereal notes and enhance roastiness.

12. The method of claim 1 wherein the aroma-containing component comprises roast and ground coffee particles and the aroma-improving agent is added before dispensing of a coffee beverage made by combining water with the particles.

13. The method of claim 12 which further comprises extracting the particles with water to form a solution, stripping volatiles from the solution with steam, and condensing the stripped volatiles to obtain a aroma concentrate, wherein the aroma-improving agent is added to the extraction water, the stripping steam or the aroma concentrate to provide the improved aroma.

14. A food product comprising a food, beverage, food-forming or beverage-forming material and an aroma-containing component that is isolated, concentrated or separated from a food, beverage, food-forming or beverage-forming material and which is treated with a nucleophile that contains at least one atom of sulfur or nitrogen that provides at least one lone pair of electrons that chemically interacts with compounds associated with the aroma-containing component to release an improved aroma compared to untreated aroma-containing components, wherein the aroma has increased amounts of desirable flavor and sensory characteristics, decreased undesirable flavor or sensory characteristics, or both, and the treated aroma-containing component is stored prior to contact with a further component of a food, beverage, food-forming or beverage-forming material and optionally with a liquid to form a product for consumption which product that, when combining the aroma-containing component with the material to form the product for consumption, the aroma-containing component imparts to the product an improved or enhanced aroma compared to the aroma provided by an untreated aroma-containing component.

15. The food product of claim 14 wherein the aroma comprises one or more of the following characteristics compared to untreated components:

increased amounts of thiols; or the same or decreased amounts of carbonyl, aldehyde or diketone moieties, so that the improved aroma comprises greater perceptible levels of roasty, sulfury, nutty, freshness and overall good flavor notes, with a decrease in rubbery, baggy, harsh, woody, groundsey, processey, pruney, molasses, oxidized or fermented notes.

16. The food product of claim 15 wherein the aroma-containing component a coffee aroma generating material that is processed to provide coffee aroma.

17. The food product of claim 16, wherein the coffee aroma is obtained from Robusta coffee beans or low quality Arabica coffee beans, wherein the sensory characteristics of the aroma are released to a lesser amount but for a longer time compared to an untreated component.

18. The food product of claim 15, wherein, when a food or beverage that contains the aroma-containing component is prepared, 65 to 90% of the sensory characteristics are initially released with the remaining amount released over a period of about 3 to 25 minutes.

19. The food product of claim 14, wherein the stored treated aroma-containing component is combined with the further component and optionally with a liquid to form the food or beverage product for consumption with the product containing an improved or enhanced aroma compared to an untreated aroma-containing component.

20. The food product of claim 19, wherein a liquid is combined with the stored treated aroma-containing component and further component to form the food or beverage product for consumption.

21. The food product of claim 19, wherein the further component is a beverage-forming component comprising tea, coffee, chocolate or malt.

22. The method of claim 1 which further comprises combining the stored treated aroma-containing component with a further component of a food, beverage, food-forming or beverage-forming material and optionally with a liquid to form the food or beverage product for consumption with the product containing an improved or enhanced aroma compared to an untreated aroma-containing component.

23. The method of claim 22, wherein a liquid is combined with the stored treated aroma-containing component and further component to form the food or beverage product for consumption.

24. The method of claim 22, wherein the further component is a beverage-forming component comprising tea, coffee, chocolate or malt.

* * * * *